United States Patent
Huang et al.

(10) Patent No.: US 8,051,307 B2
(45) Date of Patent: Nov. 1, 2011

(54) VOLTAGE-CONTROLLED DEVICE, METHOD AND COMPUTER DEVICE CAPABLE OF DYNAMICALLY REGULATING VOLTAGE AND EFFECTIVELY SAVING ENERGY

(75) Inventors: Jiang-Wen Huang, Taipei (TW); Yueh-Chin Chen, Taipei (TW)

(73) Assignee: Asustek Computer Inc., Taipei (TW)

( * ) Notice: Subject to any disclaimer, the term of this patent is extended or adjusted under 35 U.S.C. 154(b) by 578 days.

(21) Appl. No.: 12/232,028

(22) Filed: Sep. 10, 2008

(65) Prior Publication Data

US 2009/0077402 A1    Mar. 19, 2009

(30) Foreign Application Priority Data

Sep. 14, 2007  (TW) .............................. 96134564 A

(51) Int. Cl.
*G06F 1/00* (2006.01)
(52) U.S. Cl. ........ 713/300; 713/310; 713/322; 713/323; 713/340; 702/64; 702/65; 323/234
(58) Field of Classification Search .................. 713/300, 713/322, 323, 340, 310; 702/64, 65; 323/234
See application file for complete search history.

(56) References Cited

U.S. PATENT DOCUMENTS

| | | | | |
|---|---|---|---|---|
| 5,745,375 A * | 4/1998 | Reinhardt et al. | ............ | 700/286 |
| 5,767,430 A * | 6/1998 | Yamanoue et al. | ............. | 84/602 |
| 5,812,860 A * | 9/1998 | Horden et al. | ................ | 713/322 |
| 6,076,171 A * | 6/2000 | Kawata | ........................ | 713/501 |
| 6,472,899 B2 * | 10/2002 | Osburn et al. | ................... | 702/64 |
| 6,680,604 B2 * | 1/2004 | Muratov et al. | ............... | 323/285 |
| 6,747,855 B2 * | 6/2004 | Kumar et al. | ................... | 361/18 |
| 6,772,356 B1 * | 8/2004 | Qureshi et al. | ................ | 713/321 |
| 6,826,702 B1 * | 11/2004 | Shibuya | ........................ | 713/320 |
| 6,889,331 B2 * | 5/2005 | Soerensen et al. | ............ | 713/320 |
| 7,020,786 B2 * | 3/2006 | Vyssotski et al. | ............ | 713/300 |
| 7,080,268 B2 | 7/2006 | Mosley | | |
| 7,093,140 B2 * | 8/2006 | Hsu et al. | ....................... | 713/300 |
| 7,293,181 B2 * | 11/2007 | Wierzbicki | .................... | 713/300 |
| 7,421,593 B2 * | 9/2008 | Koertzen | ...................... | 713/300 |
| 7,421,604 B1 * | 9/2008 | Mimberg | ...................... | 713/340 |
| 7,441,129 B2 * | 10/2008 | Lougee | ......................... | 713/300 |

(Continued)

FOREIGN PATENT DOCUMENTS

TW    I250396    3/2006

OTHER PUBLICATIONS

Intel Corporation. Intel Pentium 4 Processor VR-Down Design Guidelines. Nov. 2002.*

(Continued)

*Primary Examiner* — Matthew Spittle
(74) *Attorney, Agent, or Firm* — Bacon & Thomas, PLLC

(57) ABSTRACT

The invention provides a voltage-controlled device, method and computer device capable of dynamically regulating voltage and effectively saving energy. The voltage-controlled device receives a VID from a CPU, determines a core voltage according to a load line defined therein, and supplies the core voltage to the CPU. The voltage-controlled device has a load line register set and a write logic. The load line register set has a plurality of registers, and the values of which represent the defined load line. The write logic changes the values of the registers in the load line register set according to a write signal.

12 Claims, 6 Drawing Sheets

U.S. PATENT DOCUMENTS

| | | | | |
|---|---|---|---|---|
| 7,441,137 B1* | 10/2008 | Mimberg | | 713/340 |
| 7,447,602 B1* | 11/2008 | Bradley et al. | | 702/60 |
| 7,636,864 B2* | 12/2009 | Burton | | 713/340 |
| 7,664,976 B2* | 2/2010 | Chen et al. | | 713/322 |
| 7,711,966 B2* | 5/2010 | Prabhakaran et al. | | 713/300 |
| 7,774,625 B1* | 8/2010 | Sheng et al. | | 713/300 |
| 7,793,125 B2* | 9/2010 | Berry et al. | | 713/320 |
| 7,821,246 B2* | 10/2010 | Koertzen et al. | | 323/349 |
| 7,899,417 B2* | 3/2011 | Elia | | 455/125 |
| 7,900,069 B2* | 3/2011 | Allarey | | 713/320 |
| 2004/0117673 A1* | 6/2004 | Arabi et al. | | 713/300 |
| 2005/0149770 A1* | 7/2005 | Koertzen et al. | | 713/300 |
| 2007/0257650 A1* | 11/2007 | Southwell et al. | | 323/283 |
| 2008/0258810 A1* | 10/2008 | Elia | | 330/53 |
| 2009/0327776 A1* | 12/2009 | Nguyen | | 713/320 |
| 2010/0013304 A1* | 1/2010 | Heineman | | 307/31 |
| 2010/0083009 A1* | 4/2010 | Rotem et al. | | 713/300 |

OTHER PUBLICATIONS

International Rectifier. VRM Design Optimization for Varying System Requirements. Powersystems World. Nov. 2003.*

Wang et al. VR Transient Improvement at High Slew Rate Load—Active Transient Voltage Compensator. IEEE Transactions on Power Electronics. vol. 22. No. 4. Jul. 2007.*

Intel Corporation. Voltage Regulator Module (VRM) and Enterprise Regulator-Down (EVRD) 10.0. Design Guidelines. Jul. 2005.*

* cited by examiner

VOLTAGE-CONTROLLED DEVICE, METHOD AND COMPUTER DEVICE CAPABLE OF DYNAMICALLY REGULATING VOLTAGE AND EFFECTIVELY SAVING ENERGY

BACKGROUND OF THE INVENTION

1. Field of the Invention

The invention relates to a voltage-controlled device for a central processing unit (CPU), particularly to a voltage-controlled device, method and computer device capable of dynamically regulating voltage and effectively saving energy.

2. Description of Related Art

Under the situation that the warm-room effect is getting severely, most countries are devoted to working out solutions to deal with such a problem. Among which, an effective and direct approach is to save energy. In the PC industry, a CPU plays an important role. The powerful operating ability thereof brings into progressive modernization of the science and technology, while consumption of the power of the CPU is a concerned object.

In the PC, the core voltage required by the CPU is determined by a voltage identification (VID) generated according to working modes of the CPU. FIG. 1A is a block diagram showing how to supply a core voltage to a CPU 11 in a conventional PC. The magnitude of the core voltage required by the CPU 11 is not the same each time. For example, as the CPU 11 is entering a power-saving mode, the core voltage required by the CPU is lower than that in a normal operating mode. Therefore, the CPU 11 will produce a VID according to the required operating voltage. In FIG. 1A, after being generated by the CPU 11, the VID is output to a voltage regulator module (VRM) 12. And then, the voltage regulator module 12 will determine the magnitude of the core voltage supplied to the CPU 11 according to the VID.

In addition, a CPU supplier, such as Intel Co., has defined an equation named a load line with respect to the voltage and current of a CPU. For example, FIG. 1B shows a load line with the load current and the core voltage respectively on X and Y axes of the plane. The coverage of the load line is that as the current of the CPU 11 varies, the voltage regulator module 12 has to change the corresponding voltage. Another key point of the load line is that as the CPU 11 is operated in a heavy load, the voltage thereof cannot be lower than a minimum voltage. Otherwise, the stability of the system cannot be assured. The previous approach of supplying the core voltage to the CPU 11 according to the VID, such as reducing or increasing the CPU voltage to proceed with energy-saving or to increase the performance of the CPU, cannot reach the step of automatically adjusting the fitted CPU voltage according to the load of the CPU, such that a user himself has to manually set a reduced or increased CPU voltage. However, a normal system cannot always be in the situation of a light load or heavy load, such that it cannot take care of the CPU simultaneously for both saving energy and increasing performance. For example, as the user wishes to increase the performance of the system, he manually sets a over-voltage for the CPU. However, when in an idle situation, such an increased CPU voltage is useless. As such, not only electric energy is wasted, but also heat-dissipating is becoming poorer.

SUMMARY OF THE INVENTION

An objective of the invention is to provide a voltage-controlled device, method and computer device capable of dynamically regulating voltage and effectively saving energy, in which software programming is adopted to dynamically change the slope and deviation of the load line, thereby developing a new load line to meet the criteria of the minimum voltage.

Another objective of the invention is to provide a voltage-controlled device, method and computer device capable of dynamically regulating voltage and effectively saving energy, in which it can correspond to a relatively low voltage as the CPU is in a light load situation, such that the whole power consuming can be reduced.

Further another objective of the invention is to provide a voltage-controlled device, method and computer device capable of dynamically regulating voltage and effectively saving energy, in which it can dynamically change the CPU voltage as the load of the CPU varies, thereby obtaining the best effect of energy-saving and in the meantime, bringing into the desired high performance of the CPU itself.

According to a feature of the invention, a voltage-controlled device is provided to receive a VID generated by a CPU and to determine the magnitude of the core voltage supplied to the CPU based on a set load line. The voltage-controlled device comprises a load line register set, having a plurality of registers, values of the plurality of registers representing the defined load line; and a write logic, being electrically connected to the load line register set for changing the values of the registers in the load line register set according to a write signal.

Another feature of the invention is to provide a computer device, comprising: a CPU; a clock generator, electrically connected to the CPU, for producing CPU clocks required by the operation of the CPU; a control circuit, connected to the CPU, for controlling operation modes of the CPU; a voltage-controlled device, connected to the CPU, for receiving a voltage identification (VID) generated by the CPU and determining the magnitude of a core voltage applied to the CPU based on a load line defined therein, the voltage-controlled device comprising a load line register set, having a plurality of registers, values of the plurality of registers representing the defined load line, and a write logic, used for changing the values of the registers in the load line register set according to a write signal; and a system controller, connected to the voltage-controlled device through a bus, for issuing the write signal via the bus, so as to allow the write logic to change the values of the registers in the load line register set.

Further another feature of the invention is to provide a method for supplying power, comprising: providing an original load line, the load current at the minimum voltage of the original load line being the maximum current thereof; varying a slope of the original load line to obtain a flat load line with its slope flatter than that of the original load line; varying deviation of the flat load line to obtain a power-saving load line, wherein the varied deviation is set at the intersection of the power-saving load line and the original load line at the maximum current; and receiving a voltage identification generated by a CPU to determine the magnitude of a core voltage applied to the CPU based on the power-saving load line.

DETAILED DESCRIPTION OF THE PREFERRED EMBODIMENT

Figure 1A:
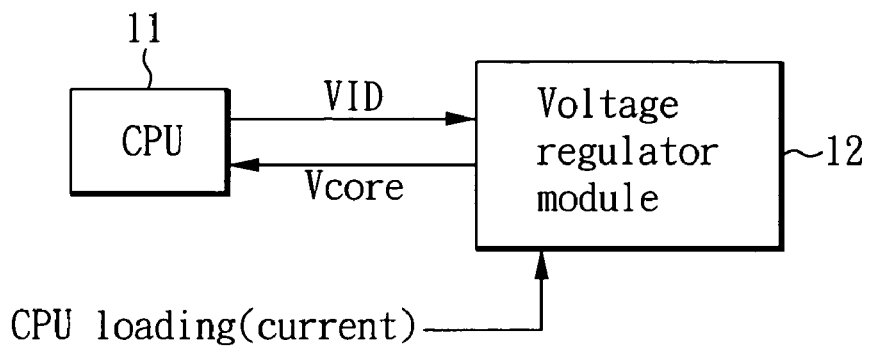
FIG. 1A is a block diagram showing how to supply a core voltage to a CPU in a conventional PC.
Figure 1B:
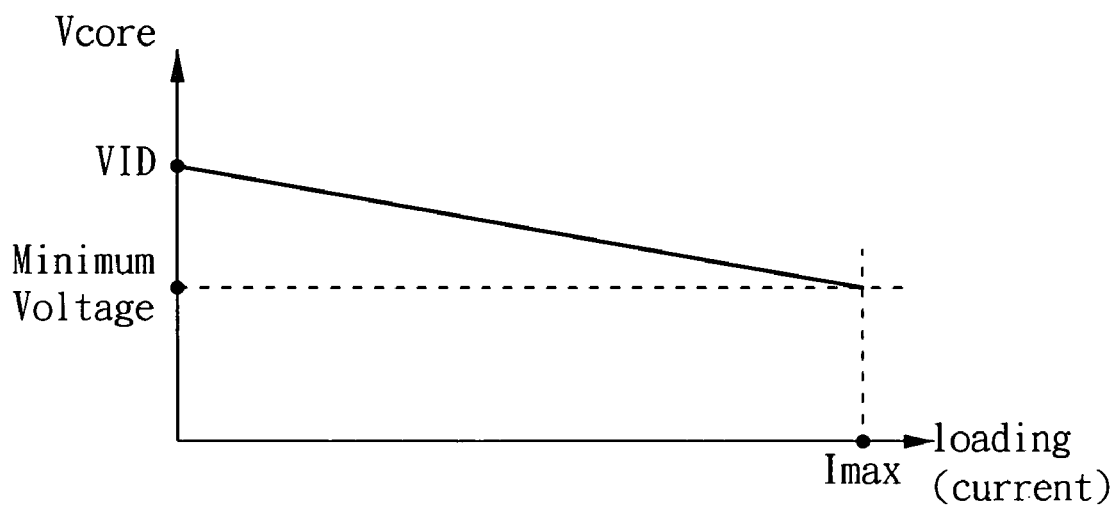
FIG. 1B is a schematic diagram of a load line.
Figure 2:
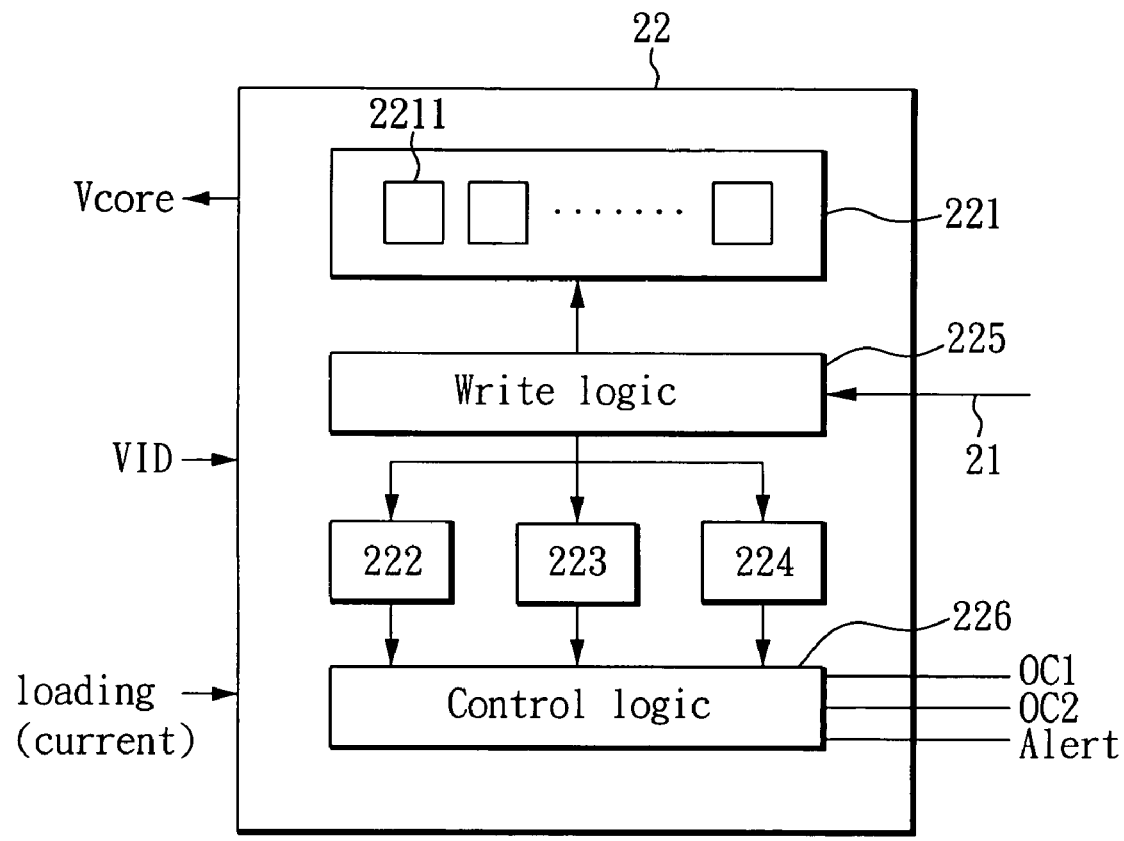
FIG. 2 is a schematic diagram of a voltage-controlled device of a preferred embodiment of the invention, capable of dynamically adjusting voltages and effectively saving energy.

FIG. 2 is a schematic diagram of a voltage-controlled device of a preferred embodiment of the invention, capable of dynamically adjusting voltages and effectively saving energy. The voltage-controlled device 22 comprises a load line register set 221, a plurality of threshold registers 222, 223 and 224, a write logic 225 and a control logic 226, wherein the load line register set 221 has a plurality of registers 2211 and each value of the plurality of registers represents a defined load line. The write logic 225 is electrically connected respectively to the load line register set 221 and the plurality of threshold registers 222, 223 and 224. The control logic 226 is electrically connected to each of the plurality of threshold registers 222, 223 and 224. The write logic 225 writes (changes) the content of the registers in the load line register set 221 and the content of the threshold registers 222, 223 and 224 according to a write signal of a bus 21.

Figure 3:
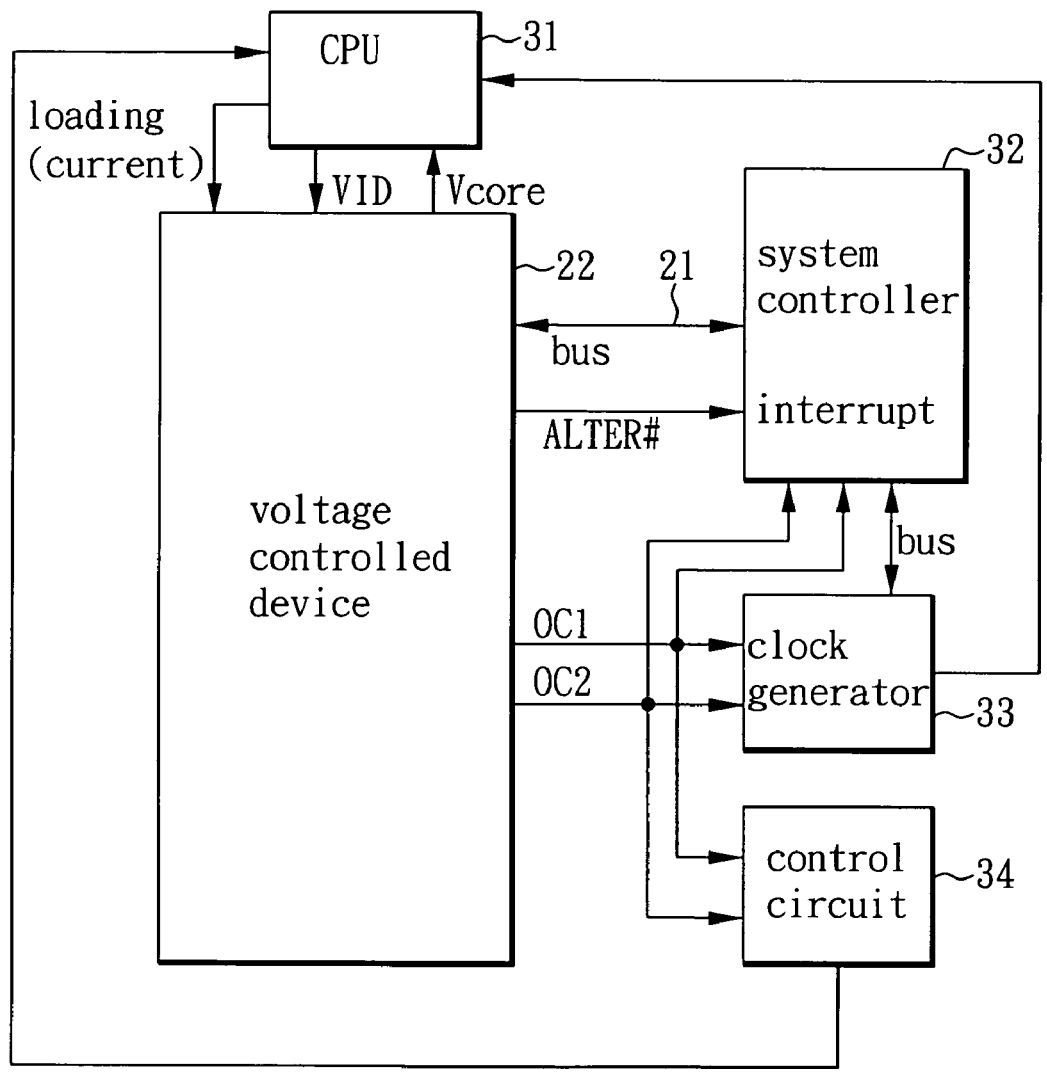
FIG. 3 is a schematic diagram of a computer device of a preferred embodiment of the invention, using a voltage-controlled device capable of dynamically adjusting voltages and effectively saving energy.

FIG. 3 is a schematic diagram of a computer device of a preferred embodiment of the invention, using a voltage-controlled device capable of dynamically adjusting voltages and effectively saving energy. The computer device comprises a CPU 31, a system controller 32, a clock generator 33, a control circuit 34 and the above-mentioned voltage-controlled device 22. The CPU 31 is electrically connected respectively to the clock generator 33, the control circuit 34 and the above-mentioned voltage-controlled device 22. The system controller 32 is electrically connected to the voltage-controlled device 22.

The system controller 32 is connected to the voltage-controlled device 22 through a standard bus 21. The clock generator 33 is used for producing CPU clocks required by the operation of the CPU 31. The control circuit 34, connected to the CPU 31, is used for controlling operation modes of the CPU 31, such as forcing the CPU to enter into an energy-saving mode (TM mode). The voltage-controlled device 22 is capable of detecting the load current of the CPU 31. In another embodiment, a detection unit (not shown in the drawing) may be configured to detect the load current of the CPU 31 and produce a detection result for outputting to the voltage-controlled device 22.

Figure 4:
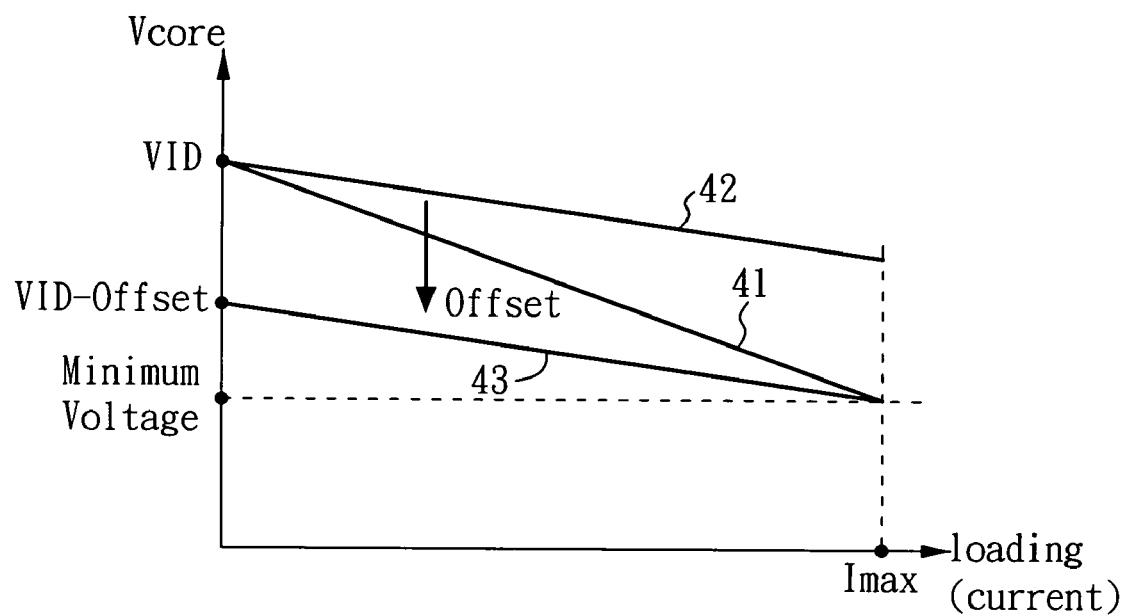
FIG. 4 is a schematic diagram showing dynamically adjusting a load line of the invention.

Please refer to FIG. 2 and FIG. 3. The voltage-controlled device 22 is provided to receive a VID generated by the CPU 31 and to determine the magnitude of the core voltage (Vcore) supplied to the CPU 31 based on a load line dynamically set in the voltage-controlled device 22, in which the load line is set by the values of the registers 2211 in the load line register set 221. In the embodiment, the initial power-on values of the registers 2211 in the load line register set 221 correspond to an original load line defined by the CPU supplier. As shown in FIG. 4, the original load line 41 of the corresponding VID has a loading current with the maximum current Imax when in the minimum voltage.

In a preferred embodiment of the invention, the write logic 225 of the voltage-controlled device 22 is utilized to dynamically adjust the original load line 41, thereby designing a power-saving load line 43 capable of saving more power, and maintaining the inherent stability of the CPU 31. It is done as follows: Firstly, the system controller 32 issues a write signal to the voltage-controlled device 22 via the bus 21 such that the write logic 225 in the voltage-controlled device 22 is used to vary the values of the registers 2211 in the load line register set 221 so as to change the slope of the original load line 41, thereby obtaining a flat load line 42 with its slope flatter than that of the original load line 41, as shown in FIG. 4.

Figure 5:
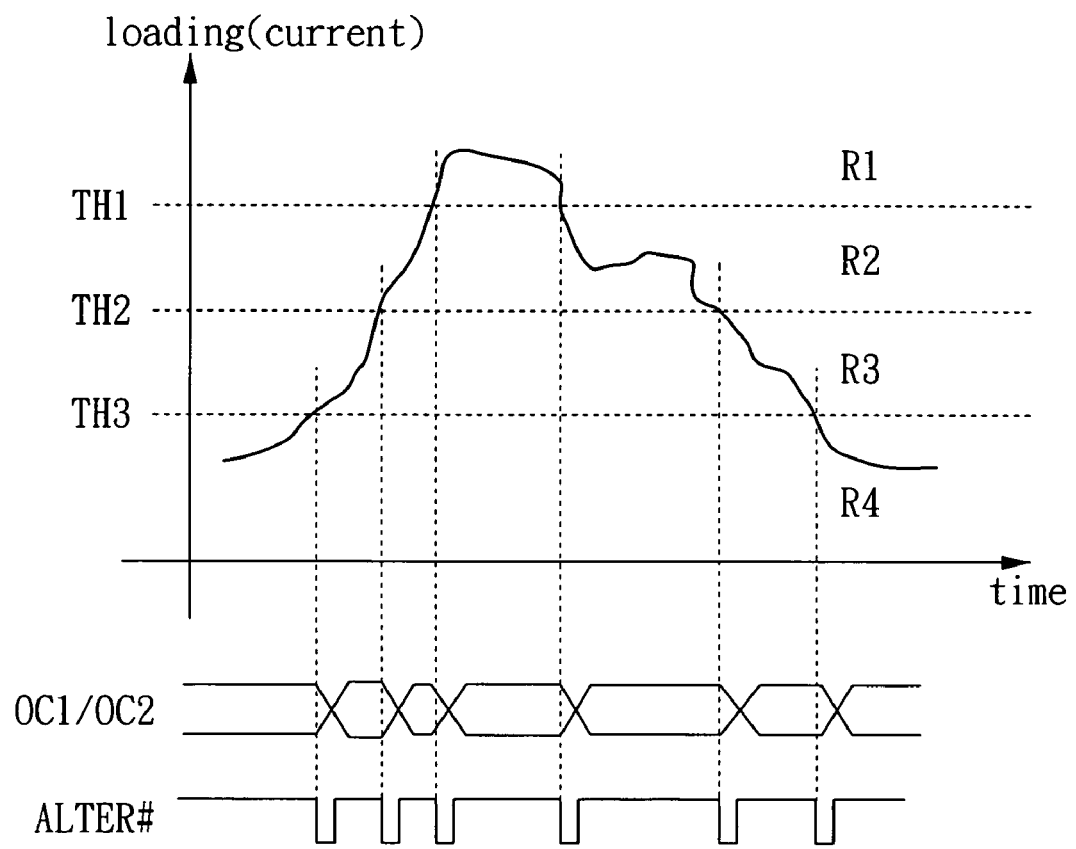
FIG. 5 is a schematic diagram showing division of the load of a CPU into four intervals of the invention.

Secondly, the system controller 32 issues a write signal to the voltage-controlled device 22 via the bus 21 such that the write logic 225 in the voltage-controlled device 22 is used to vary the values of the registers 2211 in the load line register set 221 so as to change the deviation of the flat load line 42, i.e. deviating the VID, thereby obtaining the power-saving load line 43, as shown in FIG. 5, in which the varied quantity of deviation is to allow the power-saving load line 43 to intersect the original load line 41 at the maximum current Imax. Based on it, the voltage-controlled device 22 receives a voltage identification (VID) generated by the CPU and determines the magnitude of a core voltage applied to the CPU based on the power-saving load line 43. Since the CPU voltage corresponding to the power-saving load line 43 is lower than that set by the original load line 41. Thus, the objective of saving power is accomplished. In addition, since the CPU voltage corresponding to the power-saving load line 43 is always not lower than the minimum voltage, the stability of the CPU 31 can be maintained.

Each of the above-mentioned threshold registers 222, 223 and 224 has a preset value or is set by the write logic 225 through a write signal on the bus 21 issues by the system controller 32 so as to divide the loads of the CPU 31 into different intervals. In the embodiment, three write threshold registers 222, 223 and 224 are provided and respectively set with a big, medium and small threshold value, i.e. TH1, TH2 and TH3 (TH1>TH2>TH3), so as to divide the loads of the CPU 31 into four intervals, i.e. R1, R2, R3 and R4 as shown in FIG. 5, in which interval R1 refers to one with the CPU load bigger than the threshold value TH1, interval R2 refers to one with the CPU load bigger than the threshold value TH2 but smaller than the threshold TH1, interval R3 refers to one with the CPU load bigger than the threshold value TH3 but smaller than the threshold TH2, and interval R4 refers to one with the CPU load smaller than the threshold value TH3.

The voltage-controlled device 22 further compares the detected load current of the CPU 31 with the threshold values TH1, TH2 and TH3 to monitor variation of the load of the CPU 31. As the load of the CPU 31 varies to a different interval of R1, R2, R3 or R4, the control logic 226 drives two signal lines OC 1 and OC 2 with their high/low variations to represent the different four intervals. For example, OC 1 and OC 2 both being in low represents that the load of the CPU 31 is in the interval R1, OC 1 being in low and OC 2 being in high represents that the load of the CPU 31 is in the interval R2, OC 1 being in high and OC 2 being in low represents that the load of the CPU 31 is in the interval R3, and OC 1 and OC 2 both being in high represents that the load of the CPU 31 is in the interval R4.

Through the outputs of the signal lines OC 1 and OC 2, the existing loading condition of the CPU 31 of the computer device may be informed. The computer device may provide suitable resolution with respect to various, different CPU loads, such as connecting the signal lines OC 1 and OC 2 to the clock generator 33 to control the frequency of the generated clocks, whereby, as the outputs of the signal lines OC 1 and OC 2 vary, the frequency of the CPU 31 is changed as well. Among which, OC 1 and OC 2 being both in low represents that the load of the CPU 31 is higher so as to control the clock generator 33 to produce clocks of higher frequency. In contrary, OC 1 and OC 2 being both in high represents that the load of the CPU 31 is lower so as to control the clock generator 33 to produce clocks of lower frequency.

In addition, the signal lines OC 1 and OC 2 may also be connected to the control circuit 34 such that the control circuit 34 may control working modes of the CPU 31 based on the outputs of the signal lines OC 1 and OC 2. For example, as the control circuit 34 detects the outputs of the signal lines OC 1 and OC 2 representing that the CPU 31 is in a lighter load, pin PROCHOT # of the CPU 31 is triggered to enable the CPU 31 to enter into a power-saving mode.

Furthermore, the signal lines OC 1 and OC 2 may also be connected to the system controller 32 such that based on the high or low load of the CPU represented by the outputs of the signal lines OC 1 and OC 2, the system controller 32 may issue a write signal via the bus 21 to allow the write logic 225 to vary the values of the registers 2211 in the load line register set 221, thereby changing the slope and deviation of the load line and providing a suitable CPU voltage under different loading conditions.

The control logic 226 of the voltage-controlled device 22 further provides an output of a signal line ALTER #. The signal line ALTER # outputs a signal at the time when the load of the CPU 31 switches to a different interval. The signal line ALTER # is connected to an interrupt input of the system controller 32 so as to inform the computer device of the load change of the of the CPU using interruption, for example, informing software application program of the computer device by interruption to enable a user of the computer device to know which interval the existing load of the CPU is in.

Figure 6:
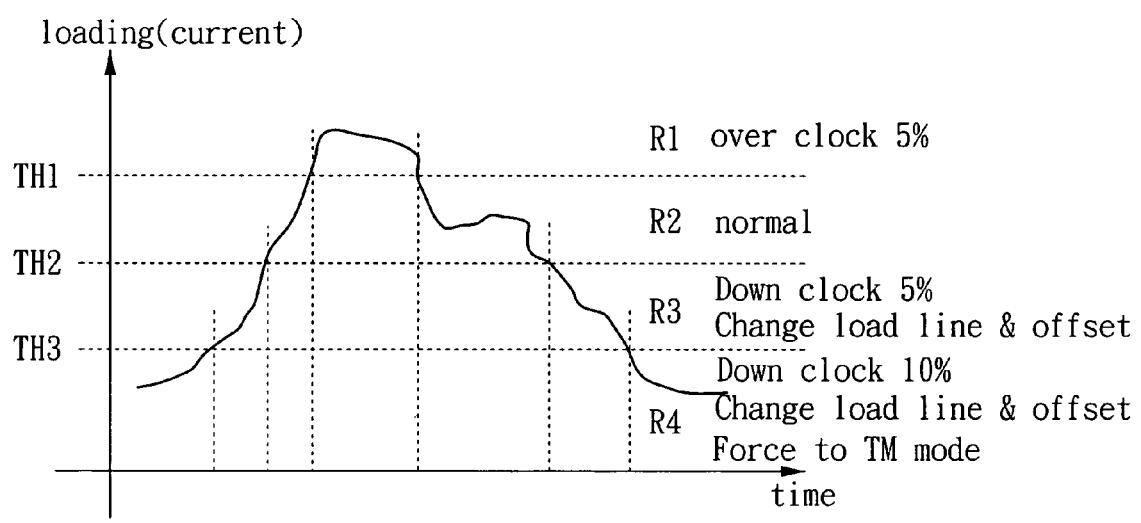
FIG. 6 shows an example to interpret different setting for loads of different CPUs.

FIG. 6 shows an example to interpret different setting for loads of different CPU 31 such that it can save power in a lighter load condition and obtain better performance in a heavier load condition. As shown in the drawing, when the load of the CPU 31 is in the interval R1, the frequency of the clocks generated by the clock generator 33 is increased by 5%, when the load of the CPU 31 is in the interval R3, the frequency of the clocks generated by the clock generator 33 is decreased by 5% and the slope and deviation of the load line are altered, and when the load of the CPU 31 is in the interval R4, the frequency of the clocks generated by the clock generator 33 is reduced by 10% and the slope and deviation of the load line are altered, forcing the CPU 31 into a power-saving mode.

It can be seen from the above that the invention is to provide a voltage-controlled device capable of dynamically regulating voltage and effectively saving energy, and a computer device using the same, in which software programming is adopted to dynamically change the slope and deviation of the load line, thereby developing a new load line to meet the criteria of the minimum voltage, and, under the situation that the CPU is in a lighter load, it can correspond to a relatively low CPU voltage, thereby decreasing the whole power consuming. In addition, through detecting the load current of the CPU and providing setting of the threshold values, accompanied by assistance of hardware and software, as the load of the CPU is changed, the CPU voltage can be dynamically changed to obtain the best power-saving effect, while bringing into the desired high performance of the CPU itself.

The above embodiments are merely exampled to interpret the invention for the sake of convenience. The scope of what is claimed in the invention should be based on the appended claims, but not limited to the above embodiments.

What is claimed is:

1. A voltage-controlled device, used for receiving a voltage identification (VID) generated by a central processing unit (CPU) and determining the magnitude of a core voltage applied to the CPU based on a load line defined therein, the voltage-controlled device comprising:
    a load line register set, having a plurality of registers, values of the registers representing the defined load line; and
    a write logic, being electrically connected to the load line register set for changing the values of the registers in the load line register set according to a write signal,
    wherein initial values of the registers in the load line register set correspond to an original load line and the load current at the minimum voltage of the original load line is the maximum current thereof; the write logic changes the values of the registers in the load line register set to vary a slope of the original load line, thereby obtaining a flat load line with its slope flatter than that of the original load line; the write logic changes the values of the registers in the load line register set to vary deviation of the flat load line, thereby obtaining a power-saving load line; the varied deviation makes the intersection of the power-saving load line and the original load line at the maximum current.

2. A voltage-controlled device as claimed in claim 1, further comprising:
    a plurality of threshold registers, each being respectively set with a threshold value; and
    a control logic, used for comparing the load of the detected CPU with threshold values so as to monitor load changes of the CPU.

3. A voltage-controlled device as claimed in claim 2, wherein the load of the CPU is divide into different intervals by the threshold values, and the control logic drives at least a first signal line for having a high/low change to represent a different interval as the load of the CPU switches to the different interval.

4. A voltage-controlled device as claimed in claim 3, wherein the control logic drives a second signal line for outputting a signal to represent a load change as the load of the CPU switches to the different interval.

5. A computer device, comprising:
    a CPU;
    a clock generator, electrically connected to the CPU, for producing CPU clocks required by the operation of the CPU;
    a control circuit, connected to the CPU, for controlling operation modes of the CPU;
    a voltage-controlled device, connected to the CPU, for receiving a voltage identification (VID) generated by the CPU and determining the magnitude of a core voltage applied to the CPU based on a load line defined therein, the voltage-controlled device comprising:
    a load line register set, having a plurality of registers, values of the registers representing the defined load line;
    a write logic, used for changing the values of the registers in the load line register set according to a write signal; and
    a system controller, connected to the voltage-controlled device through a bus, for issuing the write signal via the bus, so as to allow the write logic to change the values of the registers in the load line register set,
    wherein initial values of the registers in the load line register set of the voltage-controlled device correspond to an original load line and the load current at the minimum voltage of the original load line is the maximum current thereof; the system controller issues the write signal via the bus such that the write logic changes the values of the registers in the load line register set to vary a slope of the original load line, thereby obtaining a flat load line with its slope flatter than that of the original load line; the system controller issues the write signal via the bus such that the write logic changes the values of the registers in the load line register set to vary deviation of the flat load line, thereby obtaining a power-saving load line; the varied deviation makes at the intersection of the power-saving load line and the original load line at the maximum current.

6. A computer device as claimed in claim 5, wherein the voltage-controlled device further comprises:
a plurality of threshold registers, being respectively set with a threshold value; and
a control logic, used for comparing the load of the detected CPU with threshold values so as to monitor load changes of the CPU.

7. A computer device as claimed in claim 6, wherein the load of the CPU is divide into different intervals by the threshold values, and the control logic drives at least a first signal line for having a high/low change to represent a different interval as the load of the CPU switches to the different interval.

8. A computer device as claimed in claim 7, wherein the at least a first signal line is connected to the clock generator to drive the clock generator for controlling the frequency of the produced clocks.

9. A computer device as claimed in claim 7, wherein the at least a first signal line is connected to the control circuit to drive the control circuit for controlling working modes of the CPU.

10. A computer device as claimed in claim 7, wherein the at least a first signal line is connected to the system controller to drive the system controller to vary the values of the registers in the load line register set through the write logic.

11. A computer device as claimed in claim 7, wherein the control logic drives a second signal line, connected to an interrupt input of the system controller, for outputting a signal to notify a load change of the load of the CPU by interruption as the load of the CPU switches to a different interval.

12. A method for supplying power, comprising:
providing an original load line, the load current at the minimum voltage of the original load line being the maximum current thereof;
varying a slope of the original load line to obtain a flat load line with its slope flatter than that of the original load line;
varying deviation of the flat load line to obtain a power-saving load line, wherein the varied deviation makes the intersection of the power-saving load line and the original load line at the maximum current; and
receiving a voltage identification generated by a CPU to determine the magnitude of a core voltage applied to the CPU based on the power-saving load line.

* * * * *